US00RE36700E

United States Patent [19]

McCarthy

[11] E Patent Number: Re. 36,700

[45] Reissued Date of Patent: May 16, 2000

[54] COAXIAL CABLE CONNECTOR

[75] Inventor: Dale C. McCarthy, Pensacola, Fla.

[73] Assignee: Centerpin Technology, Inc., Gulf Breeze, Fla.

[21] Appl. No.: 09/160,455

[22] Filed: Sep. 24, 1998

Related U.S. Patent Documents

Reissue of:

[64] Patent No.: 5,775,934
Issued: Jul. 7, 1998
Appl. No.: 08/647,735
Filed: May 15, 1996

[51] Int. Cl.[7] ..... H01R 13/00

[52] U.S. Cl. ..... 439/427; 439/584

[58] Field of Search ..... 489/427, 584, 489/578–583, 585; 29/857, 858

[56] References Cited

U.S. PATENT DOCUMENTS

| | | | |
|---|---|---|---|
| 2,647,246 | 7/1953 | Gilbert | 439/419 |
| 2,719,957 | 10/1955 | Abbott | 439/411 |
| 2,839,595 | 6/1958 | Felts et al. . | |
| 2,887,667 | 5/1959 | Wolfe et al. . | |
| 3,317,883 | 5/1967 | Gourley et al. . | |
| 3,411,129 | 11/1968 | Peters | 439/427 |
| 3,444,507 | 5/1969 | Gerhard . | |
| 3,683,320 | 8/1972 | Woods et al. | 439/198 |
| 3,744,007 | 7/1973 | Horak | 439/344 |
| 3,860,320 | 1/1975 | Danner . | |
| 3,951,503 | 4/1976 | Caulkins . | |
| 4,013,333 | 3/1977 | Chang . | |
| 4,091,233 | 5/1978 | Berman . | |
| 4,178,054 | 12/1979 | Laudig | 439/394 |
| 4,261,632 | 4/1981 | Narozny | 439/394 |
| 4,339,166 | 7/1982 | Dayton | 439/344 |
| 4,352,240 | 10/1982 | Komada . | |
| 4,561,179 | 12/1985 | Brush, Jr. et al. | 439/391 |
| 4,696,908 | 9/1987 | Gutter et al. | 439/98 |
| 4,708,414 | 11/1987 | Lam | 439/394 |
| 4,722,579 | 2/1988 | Cummings et al. | 439/391 |
| 4,739,126 | 4/1988 | Gutter et al. | 439/394 |
| 4,759,722 | 7/1988 | Song | 439/344 |
| 4,770,642 | 9/1988 | Van Hoose | 439/127 |
| 4,786,760 | 11/1988 | Friedhelm . | |
| 4,968,268 | 11/1990 | Oh | 439/111 |
| 5,052,946 | 10/1991 | Homolka . | |
| 5,066,248 | 11/1991 | Gaver, Jr. et al. | 439/578 |
| 5,263,878 | 11/1993 | Lai | 439/656 |
| 5,318,458 | 6/1994 | Thörmv | 439/427 |
| 5,362,251 | 11/1994 | Bielak | 439/394 |
| 5,403,201 | 4/1995 | McCarthy . | |
| 5,503,568 | 4/1996 | Pryce | 439/427 |
| 5,569,049 | 10/1996 | Tatebe et al. | 439/394 |
| 5,607,320 | 3/1997 | Wright | 439/394 |

FOREIGN PATENT DOCUMENTS

| | | |
|---|---|---|
| 0178775 | 4/1962 | Sweden . |

*Primary Examiner*—Hien Vu
*Attorney, Agent, or Firm*—Saliwanchik, Lloyd & Saliwanchik

[57] ABSTRACT

An electrical connector for coupling to a [coax] *coaxial* cable of the type having an inner conductor enclosed in an inner concentric insulation and having a generally concentric conductive sheath therearound and an outer insulation enclosing the conductive sheath. The connector has a housing having an electrically conductive portion and a bore therein. An electrically conductive pin or prong has one end protruding axially into the housing bore and the second prong end extending in an opposite direction within a second housing bore. One or more conductive clamps are electrically connected to the conductive housing portion and insulated from the electrical conductive prong and [has] *have* pointed ends sized for driving the clamp into the outer insulation and into the conductive sheath without contacting the center conductor. A housing cap has an annular wedging member for driving the conductive [clamps] *clamp's* pointed ends [into] *through* the outer insulation and into the conductive sheath for making electrical contact therewith and for holding the [coax] *coaxial* cable within the connector. When the [coax] *coaxial* cable is slid into the connector, the center conductor is driven onto the conductive prong extending axially into the bore of the housing and the housing cap member is threaded onto a threaded portion of the housing so that the connector can be removed by unscrewing the cap member from the housing. The connector may be of the type for attaching to an apparatus, such as attaching an antenna of a television set.

10 Claims, 2 Drawing Sheets

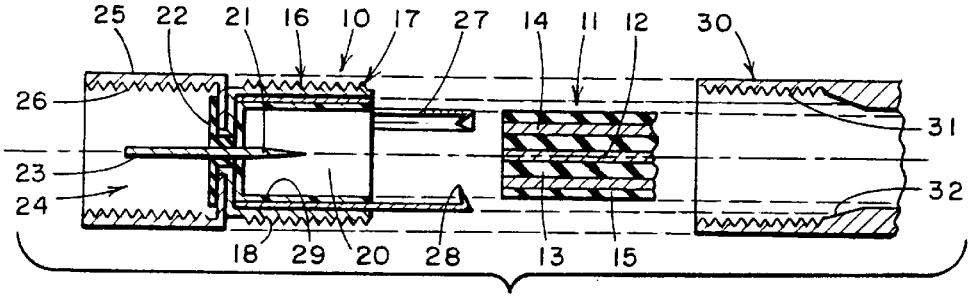
FIG. 3
(AMENDED)
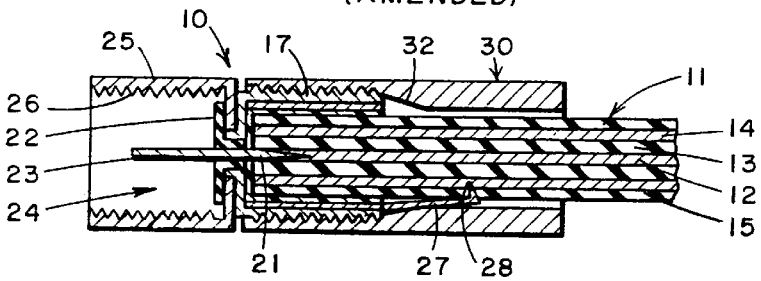
FIG. 4
(AMENDED)

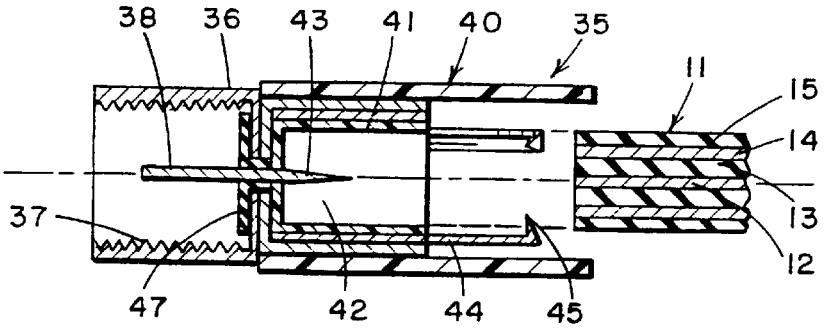
FIG. 6
(AMENDED)
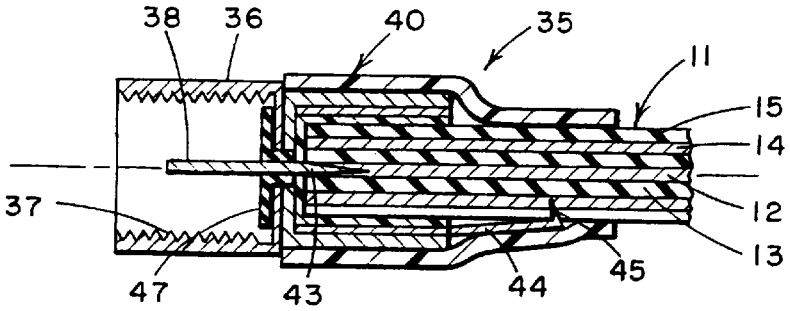
FIG. 7
(AMENDED)

COAXIAL CABLE CONNECTOR

Matter enclosed in heavy brackets [ ] appears in the original patent but forms no part of this reissue specification; matter printed in italics indicates the additions made by reissue.

BACKGROUND OF THE INVENTION

The present invention relates to electrical connectors and especially to an electrical connector for coupling to an insulated electrical coaxial cable or [wirer] *wire* without striping the end of the insulated coaxial cable.

In the past, a wide variety of electrical wire connectors have been provided for connecting to wire ends. In a typical connector, the end of the wire is stripped of insulation and the base wire is inserted into a connector where it can be soldered or clamped or otherwise attached to the connector. It is also common to tin the wire ends by coating the wire end with solder and a wide variety of connectors have been provided which removably hold the wire to the connector.

Typical connectors are seen in audio systems, such as in hi-fi speakers in which a wire end is stripped of the insulation and is inserted in an opening and a threaded nut is threaded down onto the wire, the nut can be loosened for removing the wire. Other audio speakers include spring clamps which [allows] *allow* a wire end to be stripped of insulation and inserted into an opening while lifting the spring connector clamp and then releasing the spring connector clamp onto the wire. Relifting of the spring connector clamp allows the removal of the wire end. Other commonly used connectors allow a stripped wire end to be inserted into a connector or into both ends of a connector and then clamped with pliers to collapse a conductive sleeve onto the wire. This type of connector can be insulated or not as desired since it is made of a malleable metal in which [the] collapsing *the conductive sleeve* onto the stripped wire end provides the necessary electrical contact.

In contrast to these various types of wire connectors, the present invention deals with a wire connector that does not require the insulation to be stripped and also provides, in some embodiments, for the insertion of the insulated wire end in a manner to lock the wire end in place inside the bore of a wire connector.

Prior wire connectors can be seen in the following U.S. patents. The Chang U.S. Pat. No. 4,013,333, for a wire connector having two concentric sockets adapted to be assembled one into the other and in which the inner socket has a conductive needle mounted therein for sliding a wire end into each of the connector and which also uses a spike pressed in two holes in the sleeves to penetrate the coating of the wire ends. In the Danner U.S. Pat. No. 3,860,320, a dangler cathode cable assembly is connected to a ball-like cathode member by stripping the end portion of the cable and inserting the end portion into a sleeve which is pressed into an undersized tapered socket and which has a pointed pin therein. In the Friedhelm U.S. Pat. No. 4,786,760, a cable connector for piezoelectric cable has an insulated cable end which is inserted into a sleeve. In the Berman U.S. Pat. No. 4,091,233, an electrical connector and a method of connecting an electrical cable to the connector is provided for connecting one or more insulated electrical cords or cables together. The insulated cable ends can be inserted into the receptacles on either end and onto a prong of electrically conductive material so that the prong is [an] *in* electrical contact with the wire of an insulated cord end. A container of adhesive material on the end of the receptacle is released from the container to create a physical bond between the cord and the connector to hold the cord within the connector. In [my prior] U.S. Pat. No. 5,403,201 an electrical connector is coupled to an insulated electrical conductor without stripping the end of the insulated conductor. The insulated wire is held with a spring clamp which allows the wire to be released.

Other [U.S. patents] *prior connectors* can be seen in Homolka U.S. Pat. No. 5,052,946 for a plug connector for a high voltage coaxial cable which uses a plug in contact for the connection with the central conductor. In the Komada U.S. Pat. No. 4,352,240 a method of connecting a coaxial cable to an electrical connector is provided which drives a pin shaped positive terminal into the center conductor. The S. Gerhard U.S. Pat. No. 3,444,507 is for an electrical connector for semisolid [conductors and] *conductors,* the Caulkins U.S. Pat. No. 3,951,503 is a cable splice assembly for multiconductor cables and the W. C. Gourley et al. U.S. Pat. No. 3,317,883 is for a high voltage wire coupling having a pair of prongs for coupling to the center conductor of insulated wires.

The present invention utilizes an electrical connector for coupling to an insulated electrical coaxial cable end in which the coaxial cable is inserted into a bore in the connector housing to drive a prong into the cable end. The cable is [them] *then* releasably clamped through the insulated cable with conductive clamps which extend into the conductive sheath to thereby form a *conductive* coupling to the center conductor and separately to the concentric conductive sheath or braiding.

SUMMARY OF THE INVENTION

[An]*The subject invention comprises an* electrical connector for coupling to a [coax] *coaxial* cable of the type having an inner conductor enclosed in an inner concentric insulation and having a generally concentric conductive sheath therearound and an outer insulation enclosing the conductive sheath. The connector has a housing having an electrically conductive portion and a bore therein. An electrically conductive pin or prong has one end protruding axially into the housing bore and the second prong end extending in an opposite direction within a second housing bore. One or more conductive clamps are electrically connected to the conductive housing portion and insulated from the electrical conductive prong and [has] *have* pointed ends sized for driving the clamp into the outer insulation and into the conductive sheath without contacting the center conductor. A housing cap has an annular wedging member for driving the conductive [clamps] *clamp's* pointed ends into the outer insulation and into the conductive sheath for making electrical contact therewith and for holding the [coax] *coaxial* cable within the connector. When the [coax] *coaxial* cable is slid into the connector, the center conductor is driven onto the conductive prong extending axially into the bore of the housing and the housing cap member is threaded onto a threaded portion of the housing so that the connector can be removed by unscrewing the cap member from the housing. The connector may be of the type for attaching to an apparatus, such as attaching an antenna of a television set. A second embodiment replaces the cap with a heat shrinkable insulation.

BRIEF DESCRIPTION OF THE DRAWINGS

Other objects, features, and advantages of the present invention will be apparent from the written description and the drawings in which:

FIG. 3 is a sectional exploded view of the electrical connector of FIGS. 1 and 2;

FIG. 4 is a sectional view of the electrical connector having a coaxial cable end attached thereto;

FIG. 6 is an exploded sectional view of the connection of FIG. 5;

FIG. 7 is a sectional view of the embodiment of FIGS. 5 and 6 having the cable attached thereto.

DETAILED DESCRIPTION OF THE PREFERRED EMBODIMENT

Figure 1:
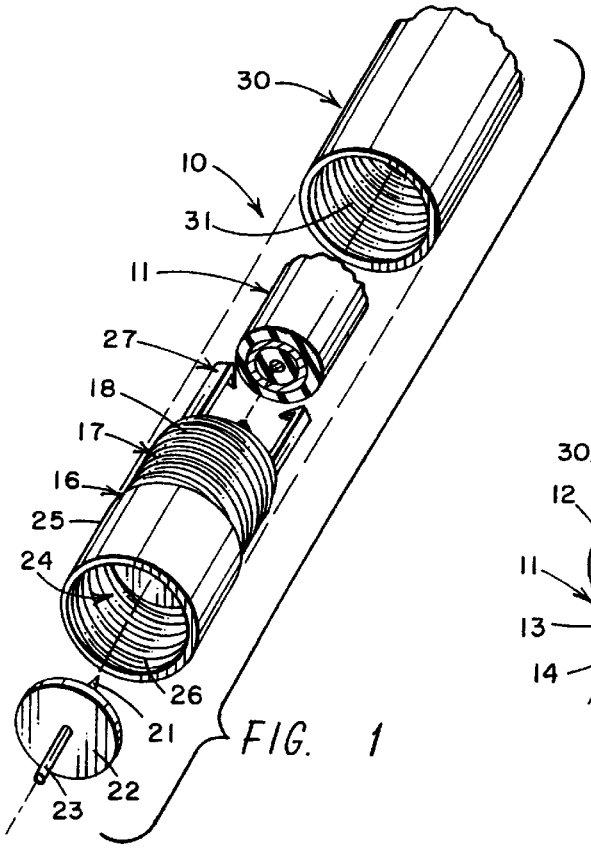
FIG. 1 is an exploded view of an electrical connector and a portion of a coaxial cable in accordance with the present invention.
Figure 2:
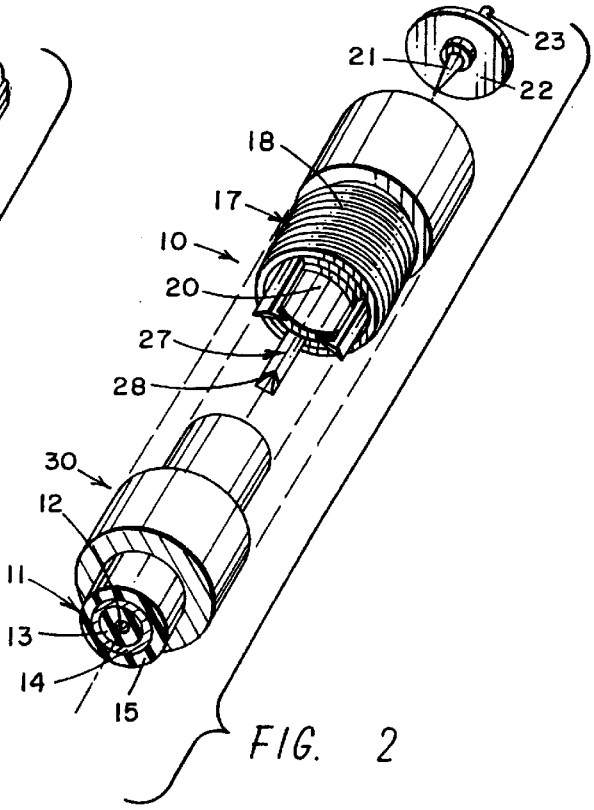
FIG. 2 is an exploded view of the electrical connector of FIG. 1 having the coaxial cable inserted into the locking cap.

Referring to FIGS. 1–4 of the drawings, an electrical connector 10 for a coaxial cable end 11 is illustrated. The coaxial cable 11 has a center conductor [12 having] *12,* a concentric insulation [13 and] *13,* a concentric conductive wire braid or sheath 14 around the insulation 13 and [having] an outer insulation layer 15 covering the conductive sheath 14. The connector 10 connects various types and sizes of coaxial cable to a variety of plugs, jacks, and connectors, all referred to herein as an electrical connector. Connection to the connector 10 is without solder and without stripping the insulation covers from the cable. The coaxial cable [10] *11* may be connected to an electrical apparatus, such as a television [set] *set,* and requires that the center conductor 12 be electrically [couple] *coupled* to another connector or apparatus and *that* the outer sheath 14 be connected separately but insulated from the center conductor 12. The connector 10 has a connector housing 16 having a generally cylindrical cable attaching portion 17 having external threads 18 and an internal bore 20. A connector prong or pin 21 extends axially into the bore 20 and is mounted to an insulation base 22 having a prong [53] *23* extending therefrom. The prongs 21 and 23 are one continuous conductive member. Prong 23 extends into a bore 24 of a cylindrical housing portion 25 having internal threads 26. Electrically conductive clamps 27 have clamping or pointed tips 28 and are connected to the housing 10 *by* electrically conductive portions 17 and 25. A plurality of clamping members 27 are contemplated even though a single clamp can perform the operation of attaching the coaxial cable end portion 11. A locking cap 30 is a generally cylindrical metal or conductive member having internal threads 31 adapted to be threadedly attached to the threads 18 of the connector body portion 17 and has an annular angled or wedging portion 32 therein. FIG. 3 also shows an insulation covering 29 which provides extra security against contact of the conductor 14 with the connector body 16 metal portions in the event a stray of wire from connector 14 extended from the cable 11.

In operation, the tip of the coaxial cable 11 does not have any of the insulation stripped from the conductors as is normally required to connect a coaxial cable to a connector. The end of the coaxial cable 11 is slid between the clamping members 27 and into the bore 20 and pushed onto the prong 21 which is axially aligned with the bore 20 and with the coaxial cable to drive the prong 21 into the center conductor 12 to make an electrical conductive contact which provides the electrical continuity through the prongs 23 which can then be attached to an electrical apparatus, such as a television set or the like, or to another coaxial cable. Once the coaxial cable [end 12] is pushed into the bore and attached, the cap member 30 is then slid over the clamps 27 and threaded onto the threads 18 of the housing portion 17. The annular wedging portion 32 drives against the ends of the clamp 27 to drive the pointed contacts 28 into the outer insulation 15 of the coaxial cable 11. The clamps 28 are sized so as to drive through the insulating layer 15 and into the concentric conductive sheath 14 to make an electrical contact therewith. This in turn [grounds this] *electrically connects the sheath 14* to the conductive housing 16 and further connects it to the apparatus that the connector is electrically connected to without having to strip the insulation or perform any acts of soldering the end of the [coax] *coaxial* cable 11. The cable is rapidly attached to the connector 10 simply by placing the cap over the cable and inserting the coaxial cable [portion] 11 in the bore and then threading the locking cap 30 onto the housing. The connector can also be removed at a later time by removing the threaded cap 30 to lift the prongs 27, which can be spring loaded so as to pull themselves back if desired, to remove the cable end 11.

Figure 5:
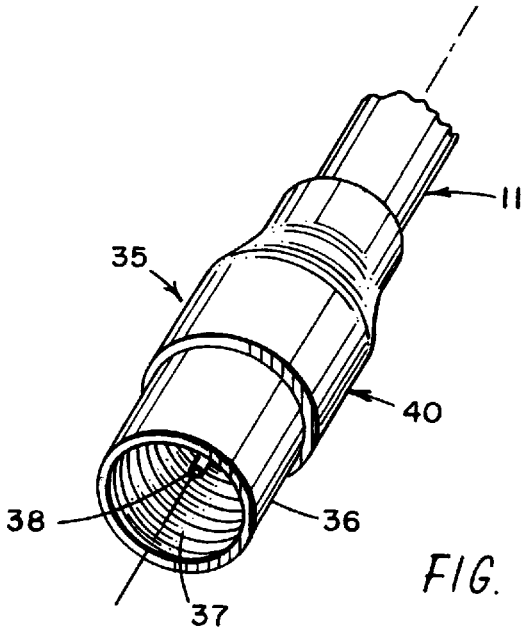
FIG. 5 is a perspective view of another embodiment of a coaxial cable connector in accordance with the present invention.

Turning now to FIGS. 5, 6 and 7, another embodiment of the coaxial cable connector of FIGS. 1–4 is illustrated in which an electrical connector 35 has the connector body 36 which may be a metal body having a [piece of] coaxial cable 11 attached to one end thereof. The other end of the connector has internal threads 37 with a protruding center conductor 38. In this embodiment there is attached to [the other] *one* end of the connector a heat shrinkable insulating sleeve 40 which extends over and is attached to the metal connector housing portion 41. The bore 42 has the center prong 43 for insertion into or adjacent the center conductor 12 of the coaxial cable 11. A plurality of clamping extensions 44 are connected to the metal housing 41 and each has a pointed prong 45 extending from the end thereof. [Coaxial] *The center conductor 12 of coaxial* cable 11 has electrical insulation 13 therearound followed by the concentric conductor or metal braid 14 which in turn is wrapped in insulation 15. In operation, the coaxial cable 11 end is inserted into the opening [46 in the insulation 40] *42* between the clamping members 44 and 45 and onto the prongs 43 which is driven into or directly adjacent *to* the center conductor 12.

Center [conductors] *conductor* 12 [on] *in a* coaxial cable [is sometimes] *may be* a single conductor wire [and sometimes] *or may be* formed of multiple strands so that the prongs 43 will [sometimes] be driven into the multiple strand wire [and at other times] *or* be directed adjacent to the single wire conductor 12. Once the cable 11 is inserted and attached to the prong, the heat shrinkable insulation 40 is heated which causes it to shrink onto the cable 11 and onto the clamps 44 to push the clamps and the pointed prongs 45 into the outer insulation 15 of the cable 11 where the prongs pass therethrough and contact the conductor member 15. To assure proper contact, the insulation 40 can be pressed down [with the finger] to press onto the clamp members 44 to properly set the prongs 45 [into] *through* the insulation 15 and into the conductor 14. The insulating sleeve 40 thus holds the connector 35 to the cable 11 while forming an insulation for the tip of the cable. The clamps 44 also lock into the insulation 15 to hold the cable in place with the [conductor] *prong* 43 making contact with the conductor 12 of the cable and thus providing the center conductor 38 [with a] contact with the cable 11. The prongs 38 and 43 are mounted to an insulating member 47, which is attached to the body 36. By replacing the cap 30 of FIGS. 1–4 with the heat shrinkable insulation 40, the cable 11 is given more flexibility and gives an insulated cover between the connection of the cable and the connector.

It should be clear at this time that an electrical connector for a [coax] *coaxial* cable has been provided which advantageously allows the [coax] *coaxial* cable to be attached to the connector without stripping or removing any of the insulation on the end of the cable to give a complete electrical connection to the center conductor and the conductive grounding sheath. However, the present invention is not to be considered as limited to the forms shown which are to be considered illustrative rather than restrictive.

I claim:

1. An electrical connector for coupling to an end of an electrical conductor of the type having a center conductor enclosed with an inner insulation and a generally concentric conductive sheath around said inner insulation and enclosed in an outer insulation comprising:

a housing having an electrically conductive portion and a bore therein, said housing having a threaded portion thereon;

at least one electrical conductive prong having two end portions, said conductive prong having one end portion attached to said housing and having a second end portion protruding axially into said housing bore for receiving the end of said electrical conductor;

an electrically conductive clamp electrically connected to said electrically conductive housing portion and insulated from said electrical conductive prong, said electrically conductive clamp having a pointed end sized for driving into said electrical conductor outer insulation and into the conductive sheath without contacting the center conductor;

a housing cap member having a bore therethrough, said bore having a threaded portion for threaded attachment to said housing threaded portion, and said bore having an annular tapered wedge portion therein and being attachable to said housing and shaped to drive said electrically conductive clamp into said outer insulation and into the concentric conductive sheath when said threaded cap member is threaded onto said housing threaded portion to thereby drive said conductive clamp into said insulated wire outer insulation to form a conductive path between the concentric conductive sheath and the electrically conductive housing portion, whereby a coaxial cable can be attached to the electrical connector by sliding the end of a coaxial cable end portion into the electrical connector housing bore and attaching the cap member.

2. An electrical connector for coupling to an electrical conductor in accordance with claim 1 in which said electrical connector has a plurality of electrically conductive clamps.

3. An electrical connector for coupling to an electrical conductor in accordance with claim 2 in which said electrically conductive prong is attached to through an electrically insulated housing portion.

4. An electrical connector for coupling to an electrical conductor in accordance with claim 3 in which said housing has two bores and said electrically conductive prong has a second end portion extending into said second housing bore.

5. An electrical connector for coupling to an electrical conductor in accordance with claim 4 in which said housing has an attaching portion adjacent said second bore for attaching said prong second end portion to another electrical connector.

6. An electrical connector for coupling to an electrical conductor in accordance with claim 5 in which said housing attaching portion includes a threaded portion for threadedly attaching said electrical connector to a second connector.

7. An electrical connector for coupling to an electrical conductor in accordance with claim 6 in which said housing has an insulating plate having said prong attached therethrough attached inside said housing bore to thereby divide said bore into two bores extending from each end of said housing.

8. An electrical connector for coupling to an electrical conductor in accordance with claim 7 in which said housing is generally cylindrical shape.

9. An electrical connector for coupling to an electrical conductor in accordance with claim 7 in which said conductive prongs are metal prongs attached to a metal housing portion.

10. An electrical connector for coupling to an electrical conductor in accordance with claim 7 in which said housing bore has an electrically insulating lining therein.

* * * * *

UNITED STATES PATENT AND TRADEMARK OFFICE

CERTIFICATE OF CORRECTION

PATENT NO. : Re 36,700
DATED : May 16, 2000
INVENTOR(S) : Dale C. McCarthy

It is certified that error appears in the above-identified patent and that said Letters Patent is hereby corrected as shown below:

Column 1,
Line 13, "striping" should read -- stripping --.
Line 17, "base" should read -- bare --.

Column 3,
Line 56, "stray of wire" should read -- stray strand of wire --.

Signed and Sealed this

Ninth Day of October, 2001

*Attest:*

Nicholas P. Godici

*Attesting Officer*

NICHOLAS P. GODICI
*Acting Director of the United States Patent and Trademark Office*